April 6, 1937.  R. STRINDBERG  2,076,305
GAS FILTER
Filed Jan. 16, 1935  4 Sheets-Sheet 1
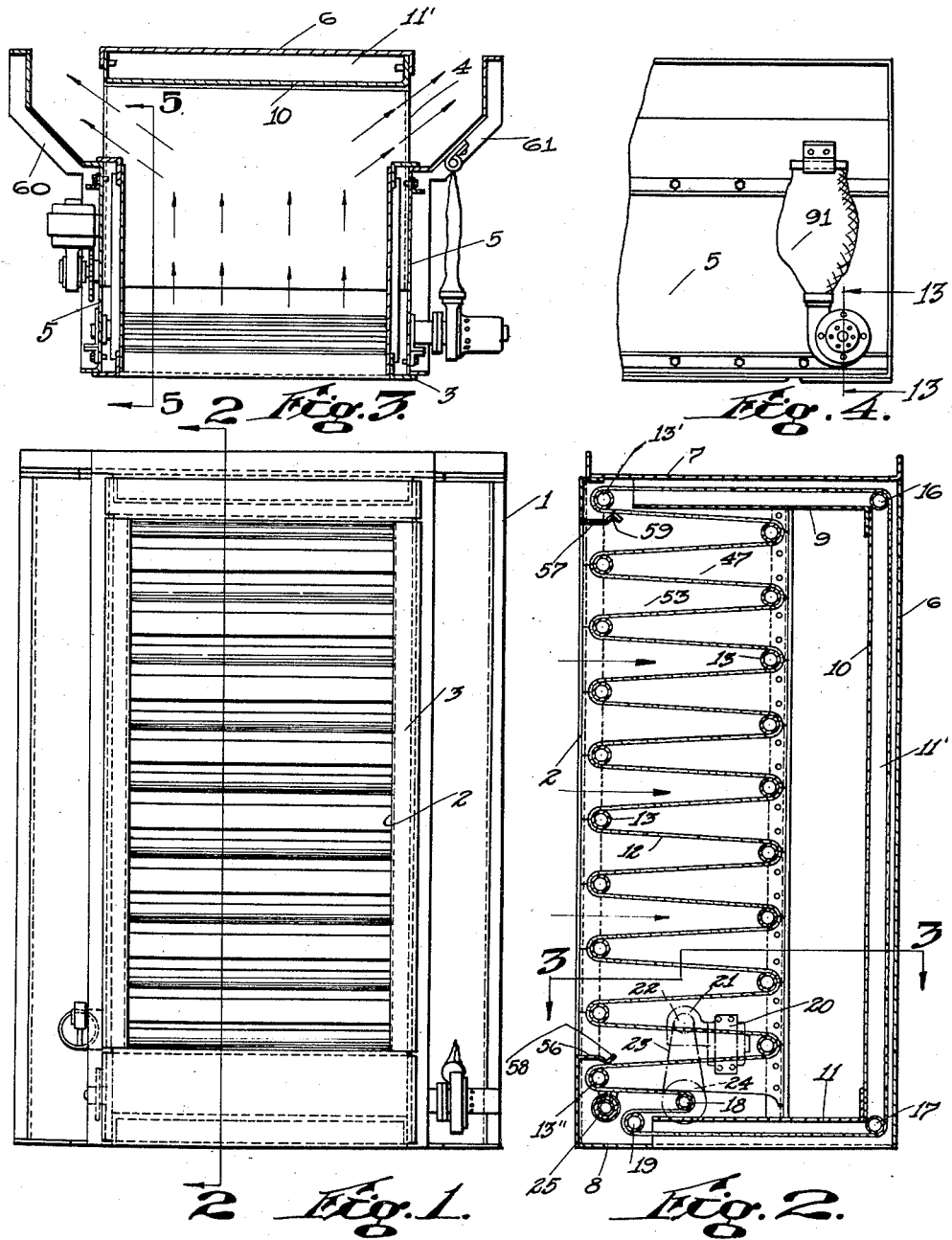

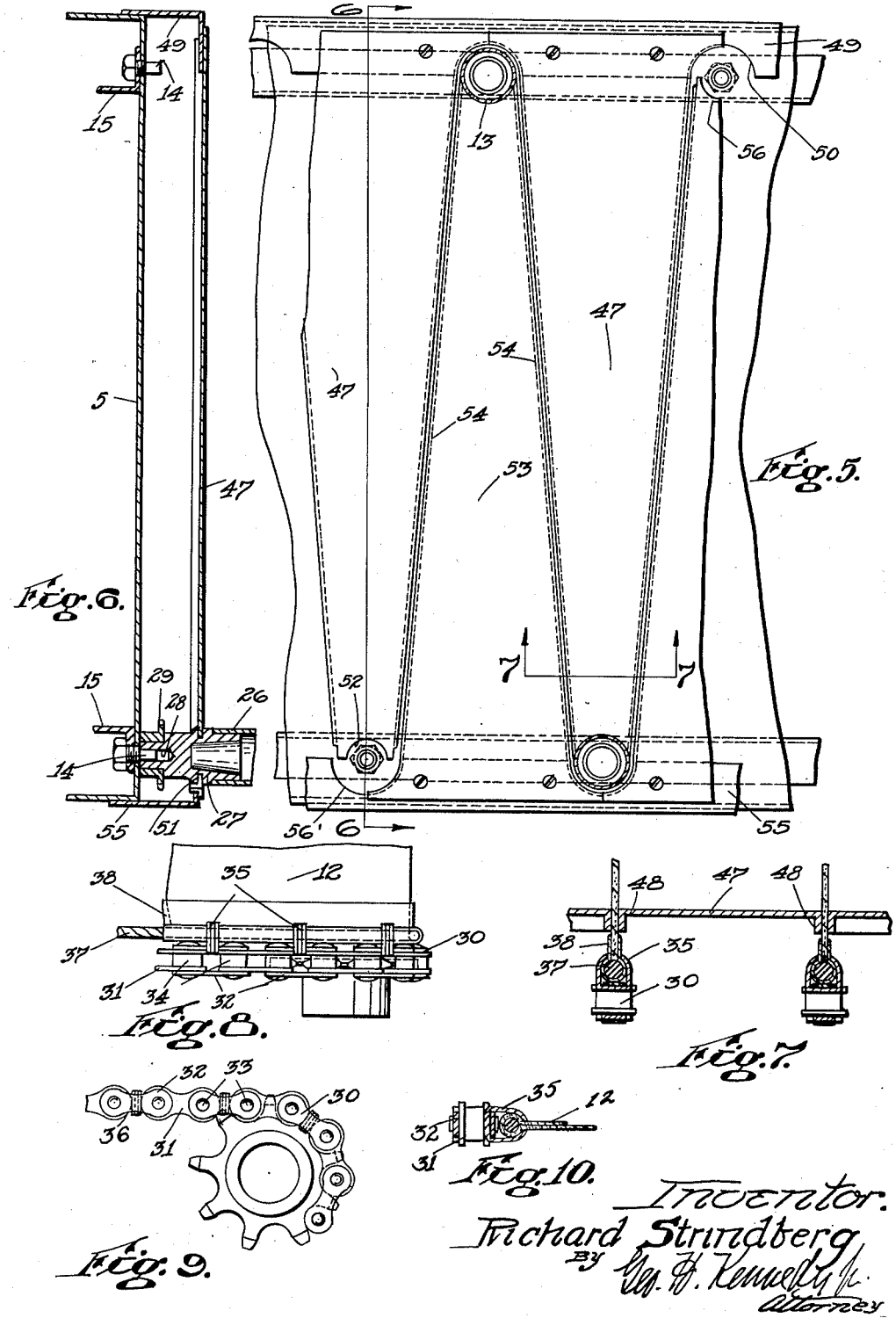

April 6, 1937. R. STRINDBERG 2,076,305
GAS FILTER
Filed Jan. 16, 1935 4 Sheets-Sheet 3

Inventor:
Richard Strindberg
By Geo. H. Kennedy
Attorney

April 6, 1937.　　R. STRINDBERG　　2,076,305
GAS FILTER
Filed Jan. 16, 1935　　4 Sheets-Sheet 4

Inventor:
Richard Strindberg
By Geo. W. Kennedy Jr.
Attorney

Patented Apr. 6, 1937

2,076,305

UNITED STATES PATENT OFFICE 2,076,305

GAS FILTER

Richard Strindberg, Worcester, Mass., assignor to Development Associates, Inc., Worcester, Mass., a corporation of Massachusetts Application January 16, 1935, Serial No. 2,090

12 Claims. (Cl. 183—63)

The present application relates to an air or gas filter of the dry type which employs a suitable more or less porous fabric for the interception of dust and other foreign particles carried by the air or gas which, for cleaning, is forced through said fabric. The present application is a continuation-in-part of applicant's copending application, Serial No. 667,003, filed April 20, 1933 for Dry type self cleaning air filters.

In prior devices of this character, which employ a continuous curtain, the latter is arranged so that the air being filtered passes twice through the fabric forming the curtain, said air passing first in one direction through the fabric, and then in the opposite direction. By this arrangement dust and other foreign matter are collected on both sides of the curtain, and as the air passes through the curtain the second time, the air picks up or entrains some of the dust and other matter deposited on said curtain so that foreign matter is carried away from the filter by the clean air. To avoid the entrainment of dust as the air or gas passes through the curtain the second time, it is necessary to clean the curtain before it is moved into air-intercepting position for the second passage of the air therethrough. This involves a complex arrangement of cleaning devices for the curtain and also makes the cleaning of the curtain more difficult, since the foreign matter removed from the gas is collected on both surfaces of the curtain. One of the principal objects of the present invention is to provide for the passage of air through the curtain in a single direction, without, however, interfering materially with the normal direction of travel of the air through the filter. This arrangement provides for very easy removal of the foreign matter collected on the curtain, since all of such foreign matter is on only one side thereof.

Another feature of the invention involves the location of the cleaning structure in a portion of the device where the filter curtain is inoperative, thereby making possible the more positive cleaning of the curtain without the use of excessive pressures which might damage the curtain. This arrangement also avoids the possibility of dust removed from the curtain by the cleaner being entrained by the air on the clean side of the filter.

Another feature of the invention is the provision of a simple arrangement by which to provide a positive air seal at the opposite edges of the curtain to avoid the passage of unfiltered air around the curtain to the clean air side of the filter. This seal involves the provision of tapering members corresponding to the shape of the chambers between adjacent passes of the curtain.

In the use of certain fabrics, such as wool felt, for the filtering material, the width and length of the curtain varies substantially as a result of the variations in humidity of the air passing through the curtain. Another feature of the invention resides in the provision for taking care of stretching or shrinking of the curtain transversely thereof, thereby eliminating the formation of wrinkles in the curtain and also avoiding the possibility of the curtain tearing away from the supports at opposite edges thereof.

In certain filters the curtain is supported and advanced by sprockets engaging with chains secured to opposite edges of the curtain. Wear on the connection between the chain and the curtain as a result of the movement of the chain over the sprocket inevitably allows the curtain to be disengaged from the chain. Another feature of the invention resides in the provision of a novel securing means by which the chain may be attached to the edge of the curtain in such a manner as to eliminate any wear and also to provide for a rapid and easy attachment of the chain to the curtain.

The most efficient arrangement of the filtering material is in the form of tapering pockets having their opposite walls converging, with the air entering said pockets in the direction in which the walls converge. In filters of the type of the present invention, particularly where the air passes through only one thickness of filtering material, the pockets have, in general, been provided with parallel side walls, thus reducing the efficiency of the filter. Another feature of the invention resides in the positioning of the filter material in the form of tapering pockets in such a manner that the direction of movement of the air through the filter is substantially unchanged.

Other and further objects and advantages of the invention will more fully appear from the following detailed description taken in connection with the accompanying drawings, in which,—

Fig. 1 is a front elevation of a filter embodying the invention.

Fig. 2 is a vertical section along the line 2—2 of Fig. 1.

Fig. 3 is a horizontal section substantially along the line 3—3 of Fig. 2.

Fig. 4 is a fragmentary elevation of one side of the casing.

Fig. 5 is a fragmentary section substantially along the line 5—5 of Fig. 3.

Fig. 6 is a fragmentary horizontal view along the line 6—6 of Fig. 5.

Fig. 7 is a fragmentary sectional view along the line 7—7 of Fig. 5.

Fig. 8 is a plan view of a sprocket showing the chain and the curtain edge thereon.

Fig. 9 is a fragmentary elevation of the structure of Fig. 8.

Fig. 10 is a sectional view through the chain on a larger scale.

Like reference characters refer to like parts in the different figures.

Figure 11:
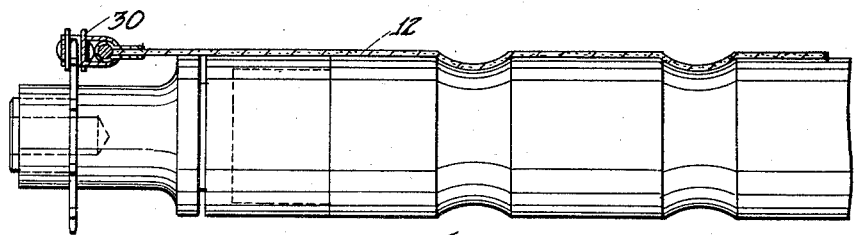
Fig. 11 is an enlarged plan view of a modified form of roll for supporting the curtain.

Referring first to Figs. 1 to 3 inclusive, the filter comprises a casing 1 having an opening 2 in the front wall 3 thereof and an opening 4 in each side wall 5 adjacent to the rear wall 6. The latter, as well as the top and bottom walls 7 and 8, is continuous as shown. A plate 9 extends parallel to the top wall 7 from a point adjacent to the front wall and engages with the upper edge of a plate 10 spaced from and extending in parallel relation to the rear wall 6. The lower edge of the plate 10 engages with the rearward edge of a plate 11 spaced above the lower wall 8 in the casing. As shown, each of the plates 9, 10 and 11 extends the entire width of the casing between the opposite side walls, and said plates define, in connection with the top, bottom and rear walls, a continuous chamber 11' which is open only at the forward edges of the plates 9 and 11 adjacent the front wall, and which is parallel to the top, rear and bottom walls.

A filter curtain 12 is supported by a plurality of horizontal rolls 13 arranged in two vertically positioned rows within the casing, said rolls being journalled as best shown in Fig. 6, on pins 14 carried by angle irons 15 secured to the side walls 5. The rolls in the opposite rows are staggered with respect to each other, and the curtain passes in zig-zag form over successive rolls in the opposite rows. The spacing of the rolls and the diameters thereof are such that the filter curtain defines a plurality of tapering pockets, adjacent passes of the curtain converging toward each other in the direction of the movement of the air through the device, this movement being indicated by the arrows, Figs. 2 and 3. The uppermost roll 13', which is located adjacent the top 7 of the casing, directs the curtain into the end of the chamber 11' defined by the top of the casing and the plate 9. A roll 16 positioned adjacent the upper end of the casing at the back thereof directs the curtain between the back 6 of the casing and the plate 10, and a similar roll 17 adjacent the bottom of the casing directs the curtain into the space between the bottom 8 of the casing and the plate 11. A driving roll 18 is journalled in the end walls of the casing adjacent the bottom thereof and the curtain as it emerges from the lower end of the chamber 11' is directed to the roll 18 by an idler roll 19. From the roll 18 the curtain passes to the lowermost roll 13'' of the staggered rolls.

The roll 18 is driven from a motor 20 through a reduction unit 21, the driven shaft of said unit having a sprocket 22 connected by a chain 23 to a sprocket 24 on the end of the roll 18. The drive for the curtain may be continuous or intermittent as desired, and procures an advance of the filter curtain upwardly through air filtering position around through the chamber and thence past a cleaning device 25 and again into air intercepting position.

Each roll as shown in Fig. 6, comprises a tube 26 in each end of which is positioned a cap 27, the latter having a recess 28 in the outer end thereof to receive the pin 14. The cap carries a sprocket 29 for engagement with a chain 30, Figs. 7 and 8, secured to each side of the filter curtain. The sprockets 29 provide for a positive advance of the filter curtain and at the same time normally maintain the curtain in stretched condition laterally of said curtain.

The chain 30 is made up of a plurality of pairs of inner links 31, Figs. 8 and 9, and a plurality of pairs of outer links 32, the adjacent pairs of outer and inner links being connected together by parallel pins 33, the latter also supporting sleeves 34 which surround the pins between the links for engagement with the several teeth of the sprocket. The filter curtain is secured to the chain at spaced points and, as shown in Figs. 8 and 9, one method of securing the curtain is by tying said curtain to said chain by loops of thread 35 passing around the reinforced edge of the curtain and around certain of the outer links adjacent to the curtain. Since the adjacent ends of successive sets of inner links are spaced from each other, as indicated, the threads may be positioned between the ends of the inner links and contact between the teeth of the sprocket and the loops of thread is thereby avoided, thus eliminating wear on said loops. It will be further noted that the central portion of the outer links around which the threads pass is narrow, as at 36, so that the threads thereon will not come in contact with anything which would tend to cause wear, the ends of said inner and outer links protecting the threads, as will be apparent. The reinforced edges of the curtain each comprise a cord 37 secured in the fold of a doubled-over fabric 38 sewed, or otherwise secured to the curtain, as shown in Figs. 7 and 8. The loops of thread 35 pass around the cord 37, as shown, for a more positive attachment of the curtain to the chains.

Figure 13:
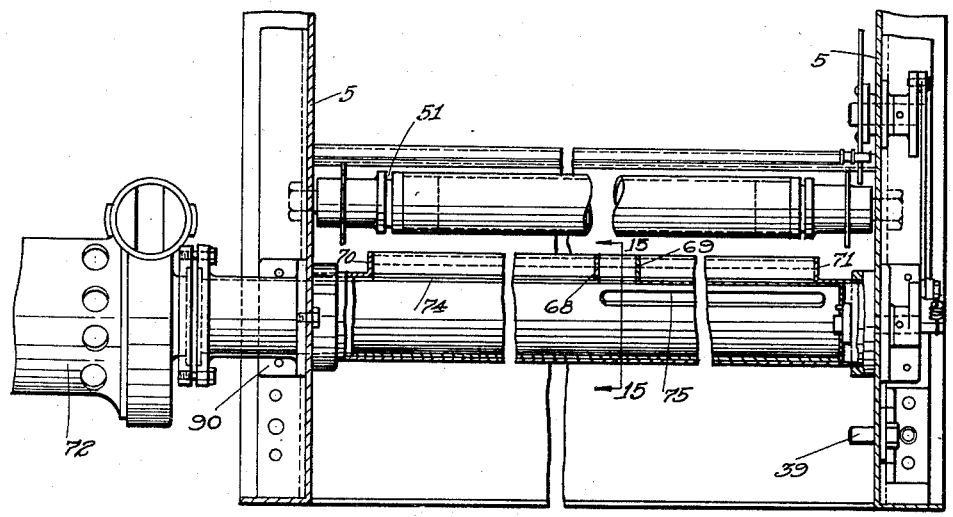
Fig. 13 is a horizontal sectional view substantially along the line 13—13 of Fig. 4, showing the cleaning structure for the curtain.
Figure 16:
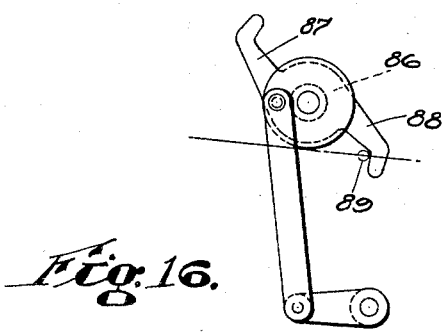
Fig. 16 is an elevation of a detail of the cleaning mechanism.
Figure 14:
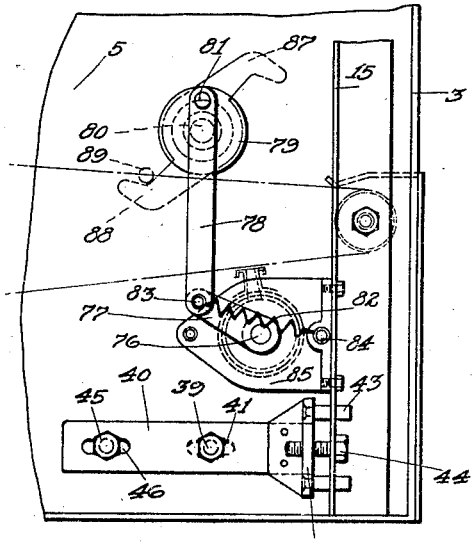
Fig. 14 is a side elevation of the structure of Fig. 13.

The filter curtain is held tight longitudinally thereof by adjustment of the idler roll 19. Referring to Figs. 13 and 14, the pins 39 for this roll instead of being fixed in the end walls of the casing, are each carried by a bar 40, longitudinally adjustable relative to the corresponding end wall, the latter having a slot 41 therein in which the pin 39 is slidable. The bar 40 has a flange 42 carrying a pair of pins 43 which extend through openings in the angle iron 15. A bolt 44 extends through an opening in the angle iron and engages a threaded opening in the flange 42, said bolt providing for longitudinal adjustment of the position of the bar 40. The latter is clamped in adjusted position by a stud 45 positioned in the end wall and engaging a slot 46 provided in the bar.

Leakage of air around the edges of the filter curtain is prevented by the positioning of a plurality of tapering plates at each edge of the filter curtain. Referring now to Figs. 5 and 6, each plate 47 on the clean air side of the curtain tapers to correspond to the taper of the pockets of the curtain and the opposite edges 48 of said plate are folded over, Fig. 7, to provide a large area adjacent to the curtain. Each plate 47 is secured adjacent its base to a vertically extending bar 49 secured to the end wall of the casing, said bar having cut-out portions 50 to extend around the rolls 13. The flanges 48 follow the arcuate edge of the plate 47 adjacent to the base thereof to overlie the outer surface of the rolls 13, as shown in dotted lines in Fig. 5. Each roll 13 is provided with a circumferential groove 51 to receive the outer end of each plate 47, the latter having an arcuate cut-out 52 so that said plate may fit accurately within said groove and provide a substantially air-tight seal. The groove 51 also supports the ends of the plates 47 to hold them in proper position.

On the intake side of the filter curtain are provided a plurality of plates 53 similar in shape to the plates 47 and having flanges 54 at opposite edges thereof for engagement with the curtain on the side thereof opposite to the flanges 48. Each of the plates 53 is secured to a vertical bar 55, angular in cross section, said plate being secured to the side wall of the casing. The outer end of each plate 53 has an arcuate recess 56 for engagement in the circumferential grooves of the rolls 13, and the bar 55 has arcuate recesses 56' to extend around the rolls 13 in the forward row of rolls. The plates 47 and 53 together form a substantially air-tight seal at the opposite edges of the filter curtain, corresponding pairs of plates being provided adjacent each side wall 5 so that no unfiltered air is allowed to pass from the intake opening 2 through the openings 4 in the side walls. Since the plates are positioned on both the intake and the clean air side of the filters, a double seal is provided, as the air must pass twice between the edges of the plates and the curtain in order to get from one side to the other of the curtain.

Leakage of air around the filter curtain at top and bottom thereof is eliminated by inwardly extending fingers 57 at the bottom and top of the opening 2, said fingers having re-bent ends 58 and 59 engaging with the filter curtain throughout the width thereof. These fingers cooperate with the plates 47 and 53 in preventing any movement of unfiltered air through the device.

Air filtered through the curtain to the clean air side thereof is exhausted through the openings 4 and is directed rearwardly by plates 60 and 61 extending outwardly and rearwardly from the forward edges of the openings 4. In this manner air passes through the casing with no substantial change in direction and at the same time passes in only one direction through the filter curtain. The air in the chamber through which the filter curtain returns from the top to the bottom of the plurality of staggered rolls is not in motion and said chamber accordingly comprises a dead air space so that dirt or foreign matter on the curtain cannot be entrained by the clean air as it leaves the filter. By the passage of air in only one direction through the filter curtain dust and other foreign particles are collected on only one side of the curtain, and accordingly, only one cleaning nozzle for the device is necessary. Moreover, since the air passes through only one thickness of filter curtain, there is less resistance to the passage of air than if the air passed twice through the curtain.

Figure 15:
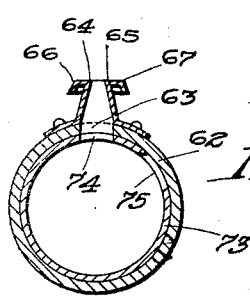
Fig. 15 is a sectional view along the line 15—15 of Fig. 13.

The filter curtain is cleaned before it enters air intercepting position by the cleaning device 25 above referred to. As best shown in Figs. 13 and 15, the device comprises a tube 62 having a longitudinal slot 63 in alinement with plates 64 and 65 which extend upwardly from the tube 62 into engagement with the filter curtain, forming a nozzle for cleaning said curtain. The outer edges of the plates 64 and 65 are bent to define flanges 66 and 67 to provide a large area in engagement with the curtain for a more positive cleaning action by eliminating leakage of air past the edges of the plates and into the nozzle. Partitions 68 and 69 are provided between the plates 64 and 65 substantially midway of the tube, and other partitions 70 and 71 are provided at opposite ends of the plates, said last partitions being substantially in alinement with the edges of the filter curtain. The partitions 68 and 69 divide the nozzle formed by the plates 64 and 65 into separate parts so that the suction provided by a suitable suction device 72 of well known construction can be all directed to one-half of the curtain at a time.

For directing the air to the desired part of the curtain the tube 62 has a rotary valve 73 positioned therein, the latter being in the form of a sleeve having slots 74 and 75 in staggered relation. The inner ends of the slots 74 and 75 overlap to assure a thorough cleaning of the entire width of the curtain. With the valve in the position shown, all of the vacuum created by the device 72 is directed to that part of the curtain which is located directly above and between the partitions 70 and 69, and when the valve has been turned to aline the slot 75 with the opening 63 all of the vacuum will be concentrated on the part of the curtain above and between the partitions 68 and 71. It will be noted that the partitions 70 and 71 are positioned beyond the part of the filter curtain which is operative, that is, said partitions are on the outer sides of the circumferential grooves in the rolls.

The valve 73 is turned in response to movement of the curtain so that each area of the curtain is successively subjected to a cleaning action. To this end said valve has an outwardly extending stub shaft 76 on the end thereof opposite to the suction device, said stub shaft having an arm 77 connected thereto. A link 78 provides a connection between the arm 77 and a disk 79 mounted on a stud 80 journalled in the side wall 5. The pin 81 to which the end of the link is connected is eccentric to the stud 80 and in response to rotation of the disk procures a movement of the valve, first counterclockwise and then clockwise, to bring each of the openings 74 and 75 successively into operative position.

A spring 82 connected to the pin 83 which provides a connection between the arm 77 and link 78 and to a fixed pin 84 on the bracket 85 which supports the nozzle and valve, normally tends to hold said valve in either of its operative positions selectively. The stud 80 extends through the side wall 5 and on the inner side thereof has a member 86 from which extend outwardly projecting arms 87 and 88 which are in a position for engagement with a pin 89 extending outwardly from one of the chains 30. As the curtain travels, the pin rocks the member 86 and accordingly shifts the valve from one operative position to the other.

The suction device 72 is supported on a bracket 90 secured to the angle iron 15 and to the side wall 5 opposite to the bracket 85 which supports one end of the tube 62 and valve 73. The suction device is preferably an electrically driven fan of well known construction which exhausts the air from within the valve 73 and discharges the air into a porous bag 91 in the usual manner.

Figure 17:
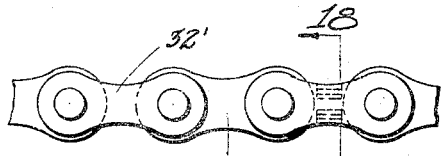
Fig. 17 is a side elevation of a modified form of chain.
Figure 18:
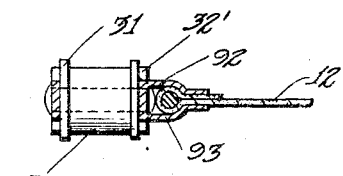
Fig. 18 is a sectional view along line 18—18 of Fig. 17.
Figure 19:
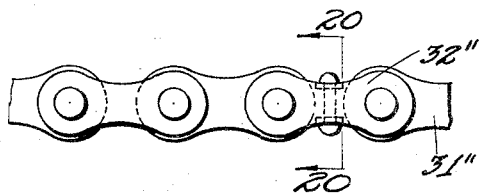
Fig. 19 is a sectional view similar to Fig. 17, showing another modification.
Figure 20:
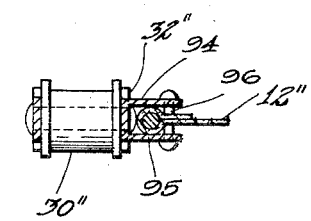
Fig. 20 is a sectional view along the line 20—20 of Fig. 19.

Referring now to Figs. 17 and 18, the curtain 12' may be secured to the chain 30' by integral fingers 92 and 93 extending outwardly from certain of the outer links 32' adjacent to the edge of the curtain. These fingers 92 and 93 are normally spaced apart a distance to admit the reinforced edge of the curtain therebetween and are thereafter bent together to retain the reinforced edge against withdrawal. It will be apparent that the curtain may be secured to the chain by this arrangement much more quickly and easily than by the sewing or tying above described and that the curtain edge will be more accurately located in the plane defined by the pins of the chains. A further mode for securing the curtain to the chain involves the provision of parallel fingers 94 and 95, Figs. 19 and 20, which extend outwardly from certain of the outer links 32" of the chain 30". The reinforced edge of the curtain 12" is positioned between the fingers 94 and 95 and a pin 96, which connects the outer ends of said fingers, extends through the filter curtain inside the reinforced edge to retain the said edge against removal. In each of these modifications the attachment is to the outer links, as will be apparent, so that the edge of the curtain does not come into any substantial contact with the chain, which might result in wear on the edge of said curtain.

Figure 12:
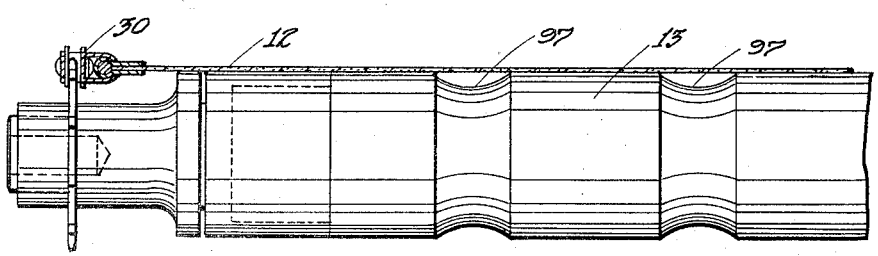
Fig. 12 is a view corresponding to Fig. 11, showing the curtain material when the latter has shrunk as a result of the humidity of the air.

Referring now to Figs. 11 and 12, a modified form of roll for supporting the filter curtain is shown. Since the curtain has at each edge thereof a chain engageable with a sprocket on each end of the roll it will be apparent that the opposite edges of the curtain are held in predetermined spaced relation to each other. The curtain itself is subject to stretching and shrinkage as a result of the humidity of the air, and also as a result of the longitudinal tension on the curtain. To avoid the formation of creases in the curtain, as a result of stretching thereof, and to make it possible to provide a sufficient width of curtain to avoid the tearing thereof as a result of shrinkage, certain, or all of the rolls 13 are provided with circumferential grooves 97, arcuate in cross-section. As shown in Fig. 11, when there is a surplus of material transversely of the curtain, that surplus is taken care of by portions of the curtain extending into the grooves in the rolls, so that the curtain is kept smooth and free from wrinkles or folds which would occur if there were no provision for accommodating the surplus material. Obviously, the longitudinal tension on the curtain aids in causing the curtain to assume the form shown in Fig. 11. As the curtain shrinks, the portions of the curtain within the grooves are drawn out of said grooves since the opposite edges of the curtain are held in predetermined spaced relation, and the curtain still presents a continuous and unbroken surface.

From the foregoing it will be apparent that the filter of the present invention is arranged to remove the impurities from gases passing through the curtain in a single direction thereof and without any substantial change in the direction of the movement of the gas through the filter. Since the air passes only in one direction through the curtain the impurities are all collected on one side of said curtain and can be readily removed by a concentrated flow of gas through the curtain in the direction opposite to the normal flow of the gas for filtering. Furthermore, leakage of gas around the edges of the filter curtain is prevented by the tapering plates which fit the pockets defined by the filter curtain, and which, without any substantial engagement with the filter curtain, have their flanged edges close enough to the curtain to form a substantially air-tight seal without producing any frictional drag on the curtain. It may be noted that the free ends of the tapering plates engage the grooves in the rollers only sufficiently to prevent leakage of air therearound without providing any frictional drag on the rollers. The pressure differential on opposite sides of the curtain is obviously so slight that these plates can form a sufficiently tight seal without pressing tightly against the curtain. By the provision of the grooves in the supporting rollers, variations in curtain width are taken care of without the formation of wrinkles in the curtain. The curtain is furthermore attached to the chain at opposite edges of said curtain in such a manner as to prevent wear on either the curtain or the connection between said curtain and the chain.

I claim:

1. In a filter, a casing, a continuous filter curtain, a plurality of rollers within said casing in a position to support said filter curtain for intercepting air passing through said casing, said rollers being staggered for supporting said curtain in a plurality of zigzag pockets, the opposite edges of said curtain being thickened, means for maintaining substantially air-tight contact between the edges of said curtain and said casing, including a plurality of plate members shaped to correspond to the interior of one of the pockets, each plate having a forward end engageable with one of said rollers and having its rearward end cooperating with the adjacent roller, and means for clamping each of said plates firmly against the side of said casing whereby the edge portion of said curtain adjacent to said thickened edge will be located between adjacent plates, the edges of the latter being sufficiently close to the curtain to obtain an air-tight seal.

2. A filter comprising a casing having an opening in the front wall thereof, a filter curtain, a plurality of rollers positioned in staggered relation for supporting said filter curtain to form a plurality of pockets, and sealing plates adapted to enter said pockets and to cooperate with said rollers and with the edges of said curtain to form a substantially air-tight seal, certain of said rollers having circumferential grooves adjacent to the ends thereof for engagement with the forward end of the sealing plates which enter said grooves to form a substantial air-tight seal.

3. A filter comprising a casing, a filter curtain, rollers within said casing for supporting said curtain in air filtering position within said casing, means for cleaning said curtain, including a plurality of suction nozzles disposed over different portions of the width of the curtain, a suction device, and means for automatically connecting said suction device with each of said suction nozzles successively for obtaining a progressive cleaning of different portions of the curtain.

4. A filter comprising a casing, a filter curtain, rollers within said casing for supporting said curtain in air filtering position within said casing, means for cleaning said curtain, including a plurality of suction nozzles disposed over different portions of the width of the curtain, a hollow tube having its interior connected with all of said suction nozzles, and a valve member rotatable within said tube adapted, by its motion, to provide communication between the interior of said tube and each of the various suction nozzles in succession.

5. A filter comprising a casing, a filter curtain, rollers within said casing for supporting said curtain in air filtering position within said casing, means for cleaning said curtain, including a plurality of suction nozzles disposed over different portions of the width of the curtain, a hollow tube having its interior connected with all of said suction nozzles, a valve member rotatable within said tube adapted, by its motion, to provide communication between the interior of said tube and each of the various suction nozzles in succession, and means controlled by movement of the filter curtain for turning said valve member.

6. A filter comprising a casing, a plurality of rollers in said casing, a filter member passing over and supported by said rollers in air filtering position within the casing, a chamber through which said curtain passes, a suction cleaning device within said chamber comprising a nozzle extending the full width of said curtain, a partition for separating said nozzle into separate portions, a suction device, a valve for successively connecting said suction device to the different portions of the nozzle, and means on the curtain for operating said valve.

7. A filter comprising a casing, a plurality of rollers positioned on said casing, a filter curtain supported by said rollers in air-filtering position, a continuous chain secured to one edge of the filter curtain, means for moving said chain for advancing said filter curtain, a suction nozzle the full width of the curtain, means for dividing said nozzle into a plurality of separate portions, a suction device, valve means for connecting said suction device successively with the different portions of the nozzle, and means actuated by the chain for turning said valve, whereby the several portions of the nozzle are successively connected to the suction device.

8. A filter having a continuous filter curtain the edge of which is reinforced, a continuous roller chain at one side of said curtain, said chain comprising a plurality of sets of inner links and outer links joined together by parallel pins, the ends of adjacent inner links being spaced from each other, and means for connecting said curtain to said outer links between the ends of adjacent inner links with the plane of the curtain coinciding substantially with the plane of the parallel pins.

9. In a filter, a casing, a plurality of rollers in said casing, a filter curtain supported by said rollers in air-filtering position, sprockets carried by certain of said rollers, a chain attached to one edge of the filter curtain and engageable with said sprockets, said chain comprising a plurality of sets of inner links and a plurality of sets of outer links joined together by parallel pins, and means for securing the edge of said curtain to certain of said outer links, said means being positioned between the ends of adjacent inner links whereby said attaching means is held out of engagement with the sprockets.

10. A filter having a continuous filter curtain, the edge of which is reinforced, a continuous roller chain at one side of said curtain, said chain comprising a plurality of sets of inner links and outer links joined together by parallel pins, the adjacent ends of successive inner links being spaced from each other, and means passing through said outer links between the ends of adjacent inner links for attaching said curtain to said outer links, said outer links having a narrow central portion to which the curtain is connected.

11. In a filter, a filter curtain having a reinforced and thickened edge, a chain at said edge, said chain comprising a plurality of sets of inner links and outer links joined together by parallel pins, certain of said outer links having pairs of projecting fingers engageable over the thickened edge of the curtain for securing said chain to said curtain.

12. In a filter, a filter curtain having a reinforced and thickened edge, a chain at said edge, said chain comprising a plurality of sets of inner links and outer links joined together by parallel pins, certain of said links having pairs of projecting fingers engageable over the thickened edge of the curtain for securing said chain to said curtain.

RICHARD STRINDBERG.